United States Patent
Su

(10) Patent No.: US 8,457,196 B2
(45) Date of Patent: Jun. 4, 2013

(54) METHOD FOR IMAGE VISUAL EFFECT IMPROVEMENT OF VIDEO ENCODING AND DECODING

(75) Inventor: Qian Su, Guangdong (CN)

(73) Assignee: Shenzhen Temobi Science & Tech Co., Ltd., Shenzhen, Guangdong (CN)

( * ) Notice: Subject to any disclaimer, the term of this patent is extended or adjusted under 35 U.S.C. 154(b) by 6 days.

(21) Appl. No.: 12/747,793

(22) PCT Filed: Aug. 28, 2009

(86) PCT No.: PCT/CN2009/073593
§ 371 (c)(1),
(2), (4) Date: Jun. 11, 2010

(87) PCT Pub. No.: WO2010/111855
PCT Pub. Date: Oct. 7, 2010

(65) Prior Publication Data
US 2012/0027076 A1    Feb. 2, 2012

(30) Foreign Application Priority Data
Apr. 1, 2009 (CN) .......................... 2009 1 0106472

(51) Int. Cl.
*H04N 7/12* (2006.01)
(52) U.S. Cl.
USPC ................................................. 375/240.02
(58) Field of Classification Search
USPC ........................ 375/240.01, 240.02, 240.29
See application file for complete search history.

(56) References Cited

U.S. PATENT DOCUMENTS

| | | | | |
|---|---|---|---|---|
| 2005/0099545 | A1* | 5/2005 | Zhu | ............................... 348/630 |
| 2005/0163393 | A1 | 7/2005 | Asari | |
| 2008/0043854 | A1* | 2/2008 | Kim et al. | ............... 375/240.29 |

FOREIGN PATENT DOCUMENTS

| | | |
|---|---|---|
| CN | 1127562 A | 7/1996 |
| CN | 1545327 A | 11/2004 |
| CN | 1744687 A | 3/2006 |
| CN | 101061506 A | 10/2007 |
| EP | 0723364 A2 | 7/1996 |
| WO | 0043954 A2 | 7/2000 |
| WO | 2008023856 A1 | 2/2008 |
| WO | 2008047291 A2 | 4/2008 |

* cited by examiner

*Primary Examiner* — Mehrdad Dastouri
*Assistant Examiner* — Jared Walker
(74) *Attorney, Agent, or Firm* — Morris Manning & Martin LLP; Tim Tingkang Xia, Esq.

(57) ABSTRACT

The present invention relates to method for image visual effect improvement of video encoding and decoding. The method at an encoder comprises enhancement process of image boundary information, adaptive brightness transformation process, and adaptive enhancement process of chrominance information. The method at a decoder comprises adaptive enhancement of boundary information based on the block statistical characteristic, adaptive brightness transformation process, and adaptive enhancement process of the chrominance information. Based on characteristics of the image source at the encoder and the decoder, the present invention uses brightness space processing technology to eliminate blocking artifacts, enhance high frequency information and improve brightness information distribution, so as to improve brightness information of the image in one aspect, and uses the chroma space processing technology to enhance color effect of the image in the other aspect, and finally, the objective of improving visual effect of the image is achieved.

4 Claims, 4 Drawing Sheets

METHOD FOR IMAGE VISUAL EFFECT IMPROVEMENT OF VIDEO ENCODING AND DECODING

FIELD OF THE INVENTION

The present invention relates to video encoding and decoding methods, more particularly, to a method for image visual effect improvement of video encoding and decoding.

BACKGROUND OF THE INVENTION

Based on human vision system, color can be described by brightness, hue and saturation. Usually, hue and saturation are generally referred to as chroma, which is used to represent the category and depth of color. In the video encoding process, for different frames, regions people cared about are dynamically changed, which requires that the algorithm is able to adjust transformation function according to the change of the video sequences, so that brightness distribution of the image can be improved according to demand in various scenes. The visual quality of the image can be improved by a constant transformation function of brightness with the parameters obtained by considerable statistical experiments. However, if the same approach used in the ordinary scenes is carried out in some specific scenes (such as a wholly dark scene), visual quality of the image will be decreased.

For color information of an object, people always hope that, the more colorful the better. Considering the requirement of visual comfort, the bigger the transform intensity is, the more color of the image with insufficient chroma information is improved. Skin color of human beings is between yellow and red. If the same model is used for the whole region, taking relatively large adjusting values, uncomfortable feeling to skin color will be generated, and taking relatively small adjusting values, the requirement of enhancing color information of objects in other color gamut will be restricted. If the algorithm is dependent on the detection of skin color regions, firstly, computational complexity is increased, and secondly there isn't a detection algorithm for skin color regions with 100% accuracy, thirdly many problems such as balance transition brought in by incorrect judgment of discrete point field will occur. Although people are more sensitive to luminance than to chrominance, preprocessing should be employed to enhance the color of the image, since chroma information carried by the image sequence (such as image captured by a camera) processed by the video encoder is insufficient at some time. Most conventional color processing methods are based on RGB or HSV color model, while a separate representation mode of luminance and chrominance, i.e., YUV, is used in video encoding. Although transformation between different models can be realized through color space transformation technology, computational complexity bought in by transformation and invert transformation is also considerable.

Image quality will be decreased in varying degrees after encoding. Problems, such as blocking artifacts brought in by block-based encoding and decoding strategy, attenuation and losing of high frequency information and so on, are present in the image sequence after decoding. In order to eliminate blocking artifacts without losing of boundary high frequency information, and take characteristics of block-based encoding and decoding strategy into account that the blocking artifacts always present at the boundary between blocks, a method for block-based boundary adaptive enhancement is employed.

SUMMARY OF THE INVENTION

In order to improve visual effect of video sequences at an encoder, the present invention provides a method for image visual effect improvement of video encoding and decoding, wherein a boundary information enhancement technology is used to increase the amount of high frequency information contained in the image, and adaptive enhancement technologies for luminance and chrominance respectively are provided for improving the brightness information distribution of the image and enhancing chroma information of the image.

The method according to present invention comprises the following steps at the encoder:

S11: extracting image boundary information and enhancing a boundary information operation, the step further comprising:

S111: Extracting boundary information $h(x,y)$ of an image $f(x,y)$, $$h(x,y)=\gamma(f(x,y))$$

S112: Obtaining a boundary enhanced image $g(x,y)$ by transforming the extracted boundary information $h(x,y)$ and the image $f(x,y)$, $$g(x,y)=\phi(f(x,y),h(x,y))$$

wherein $f(x,y)$ is a brightness value of the original image at the encoder, $\gamma(x)$ is a boundary information extracting function, $\phi(f(x,y),h(x,y))$ is a transformation function selected according to characteristics of the original image and the boundary information;

S12: Adaptive luminance transforming to improve luminance distribution:

$$g'(x,y)=\psi(f(x,y),\alpha(k)|k=1,2,\ldots,K),$$

wherein $g'(x,y)$ is a transformed brightness value, $\psi(x,\alpha(k)|k=1, 2, \ldots, K)$ is a transformation function, wherein $\alpha(k)$ is a set of parameters of the transformation function $\psi(x,\alpha(k)|k=1, 2, \ldots, K)$, and K is the number of the parameters;

S13: Adaptively enhancing the chrominance information, which is performed in the UV color space, $$(u'(x,y),v'(x,y))=w*\phi(u(x,y),v(x,y),\alpha_u,\alpha_v,\beta_u,\beta_v)$$

wherein $\phi(u(x,y),v(x,y),\alpha_u,\alpha_v,\beta_u,\beta_v)$ is a transformation function, w is a weight function, and a UV chroma deviation position is determined by $\alpha_u$ and $\alpha_v$, a chroma adjusting step is determined by $\beta_u$ and $\beta_v$.

Image quality will be decreased in varying degrees after encoding. Problems, such as blocking artifacts brought in by block-based encoding and decoding strategy, attenuation and losing of high frequency information and so on, are present in the image sequence after decoding. In consideration of a need for improving visual effect of the image at the decoder, a method for image visual effect improvement of video encoding and decoding is provided in the present invention.

The method according to present invention comprises the following steps at the decoder:

S21: selecting a processing mode $$t\_0 = \sum_{x,y \in \Re_0} \hbar_0(f(x,y))$$

according to block statistical characteristic,
    if (t_0>Thres_1) mod e=Flat region processing method
    else mod e=Complex region processing method then implementing operations for eliminating blocking artifacts and enhancing boundary information based on the determined processing mode;

wherein f(x,y) is a original image value at the decoder, t_0 is a statistical variable name of a statistical region $\Re_0$, $\hbar_j$ (j=0, 1, 2) is a statistical characteristic function, $\Re_j$ is a statistical region corresponding to $\hbar_j$, and Thres_1 is a threshold for determining whether the current processing region is a flat region or a complex region;

S22: Adaptively transforming the brightness and improving brightness distribution of the image:

$$g(x,y)=\psi(f(x,y),\alpha(k)|k=1,2,\ldots,K),$$

wherein f(x,y) is a brightness value of the original image at the decoder, g(x,y) is a transformed brightness value, $\psi(x,\alpha(k)|k=1, 2, \ldots, K)$, is a transformation function, wherein $\alpha(k)$ is a set of parameters of the transformation function $\psi(x,\alpha(k)|k=1, 2, \ldots, K)$, and K is the number of the parameters;

S23: Adaptively enhancing the chroma information, wherein the chroma information adaptive enhancement is performed in a UV chroma space, $$(u'(x,y),v'(x,y))=w*\phi(u(x,y),v(x,y),\alpha_u,\alpha_v,\beta_u,\beta_v)$$

wherein $\phi(u(x,y),v(x,y),\alpha_u,\alpha_v,\beta_u,\beta_v)$ is a transformation function, w is a weight function, and a UV chroma deviation position is determined by $\alpha_u$ and $\alpha_v$, a chroma adjusting step is determined by $\beta_u$ and $\beta_v$.

Through the above mentioned method, adaptive adjustment can be applied to eliminate the blocking artifacts, and enhance the image luminance and chrominance information, in such a way the object of improving the objective effect and subjective effect of the coded and decoded images can be achieved. When the adaptive boundary information enhancement technology according to present invention is employed at the decoder, the effect of separation method in enhancing boundary information and eliminating blocking artifacts can be maintained while the processing speed is improved, and the objective effect and subjective effect of the image also can be improved remarkably.

BRIEF DESCRIPTION OF THE DRAWINGS

The following drawings illustrate preferred, but not exclusive embodiments of the inventions.

DETAILED DESCRIPTION OF THE PREFERRED EMBODIMENT

Figure 1:
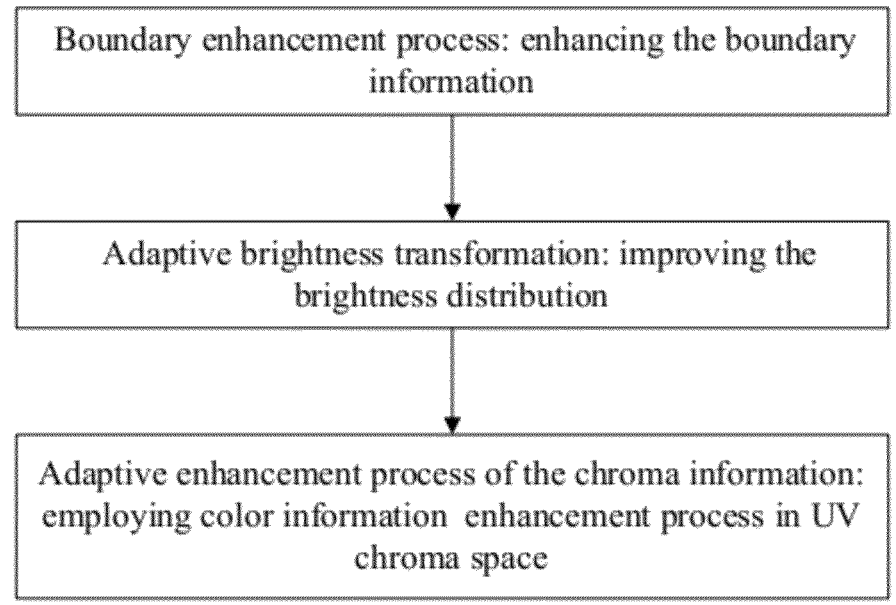
FIG. 1 is a flow diagram of a method at the encoder according to an embodiment of the present invention.
Figure 2:
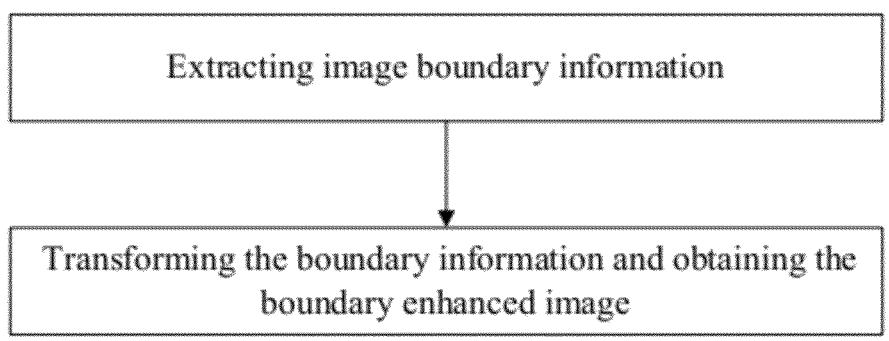
FIG. 2 is a flow diagram of boundary information enhancement shown in FIG. 1.

Referring FIG. 1, FIG. 1 is a flow diagram of the method for image visual effect improvement of video encoding and decoding at the encoder according to an embodiment of the present invention. The method comprises the following steps at the encoder:

1. The present step implements boundary information enhancement process, and further comprises the following steps:

a1: Extracting boundary information h(x,y) of an image f(x,y), $$h(x,y)=\gamma(f(x,y))$$

b1: Obtaining a boundary enhanced image g(x,y) by transforming the extracted boundary information h(x,y) and the image f(x,y), $$g(x,y)=\phi(f(x,y),h(x,y))$$

wherein: f(x,y) is a brightness value of the original image at the encoder, $\phi(f(x,y),h(x,y))$ is a transformation function selected according to characteristics of the original image and its boundary information, $\gamma(x)$ is a boundary information extracting function, wherein different methods for extraction can be employed according to different applications requirements. With respect to derivative method, for example, a first order derivative, a second order derivative and so on can be employed, such as gradient module extracting method:

$$|grad(f(x, y))| = \max_l \left( \frac{\partial f(x, y)}{\partial l} \right)$$

2. In video encoding process, for different frames, regions people cared about are dynamically changed, which requires that the algorithm is able to adjust transformation function according to the change of the video sequences, so that brightness distribution of the image can be improved according to demand in various scenes.

The visual quality of the image can be improved by a constant transformation function of brightness with the parameters obtained by considerable statistical experiments. However, if the same approach used in the ordinary scenes is carried out in some specific scenes (such as a wholly dark scene), visual quality of the image will be decreased.

The present step implements adaptive brightness transformation and improvement of image brightness distribution. The principle of adaptive brightness transformation is that, the set of parameters of the transformation function is adaptively updated according to a statistical characteristic of brightness value of the image before being transformed, so that the transformation function is adjusted dynamically along with different image characteristics, and thus the processing method is optimized:

$$g(x,y)=\psi(f(x,y),\alpha(k)|k=1, 2, \ldots, K),$$

wherein f(x,y) is a brightness value of the original image at the decoder, g(x,y) is a transformed brightness value, $\psi(x,\alpha(k)|k=1, 2, \ldots, K)$ is the transformation function, wherein $\alpha(k)$ is the set of parameters of the transformation function $\psi(x,\alpha(k)|k=1, 2, \ldots, K)$, and K is the number of the parameters.

Figure 3:
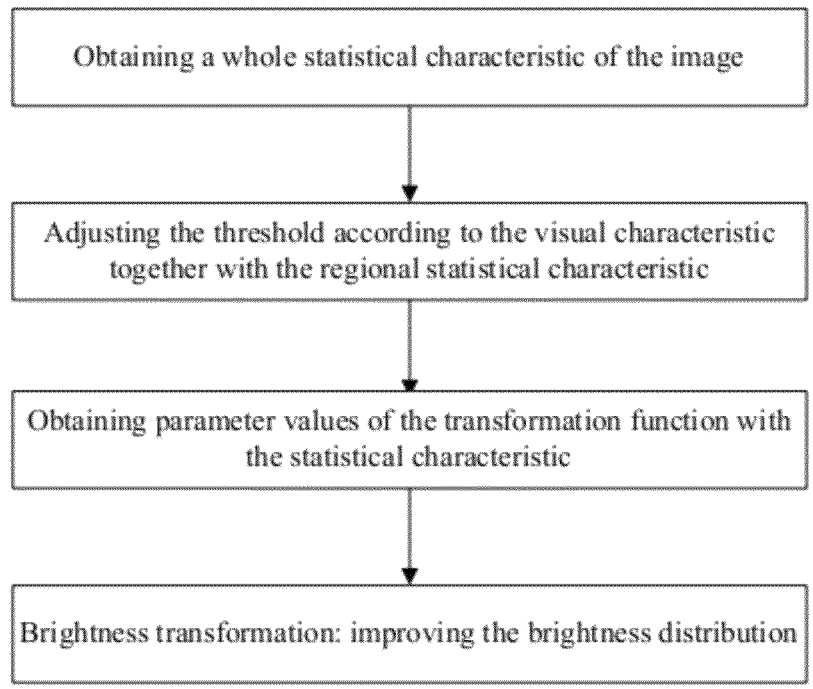
FIG. 3 is a flow diagram of adaptive brightness transformation shown in FIG. 1.

As shown in FIG. 3, step 2 further comprises the following steps:

a2: Given a characteristic space of the current frame image is $$\xi = \bigcup_{k=1}^{M} \xi_k,$$

$\xi_i \cap \xi_j = \phi, i \neq j$, and a whole statistical characteristic of the image is obtained by statistic of the brightness information, for (k=0; k<M; k++) if (f(x,y)∈$\xi_k$) Calculating a statistical characteristic $\phi_k$(f(x,y)) of $\xi_k$.

Finally, the statistical characteristic of the current frame image is obtained:

{$\phi_k$(f(x,y))|k=1, 2, . . . , M};

wherein $\xi_k$ and $\phi_k$(f(x,y)) are image characteristic subspace, the statistical characteristic of $\xi_k$ respectively;

b2: The threshold is adjusted according to visual characteristic together with the regional statistical characteristic, and the image is divided into different regions $$\Omega = \bigcup_{k=1}^{N} \Omega_k.$$

The statistical characteristic threshold $P_H$ is adjusted to be $P_H'$ according to a statistical relationship between the global area and the regions, $P'_H$=ratio*$\eta$($P_H$, $\Phi_1$, $\Phi_2$, . . . , $\Phi_N$)

wherein $\Phi_k$ is a statistical characteristic of $\Omega_k$, $\Phi_k$={$\phi_1$($\Omega_k$), $\phi_2$($\Omega_k$), . . . , $\phi_M$($\Omega_k$)}

$P_H$, $P'_H$ are the threshold obtained through the whole statistical information and the adjusted threshold respectively;

c2: Parameter values of the transformation function is obtained based on the statistical characteristic;

$\alpha$(k)= $\hbar_{(P'_H)}$ k=1, 2, . . . K $\hbar_k$ (x) is a adjusting function of the parameter $\alpha$(k) of the transformation function $\psi$(x,$\alpha$(k)|k=1, 2, . . . , K);

d2: By using brightness transformation function $\psi$(f(x,y), $\alpha$(k)|k=1, 2, . . . , K), brightness transformation is implemented and distribution of the image brightness information is improved;

wherein f(x,y) is the brightness value of the original image at the decoder, g(x,y) is the adjusted brightness value, $\psi$(x,$\alpha$(k)|k=1, 2, . . . , K) is the transformation function, wherein $\alpha$(k) is the set of parameters of the transformation function $\psi$(x,$\alpha$(k)|k=1, 2, . . . , K), K is the number of the parameters.

3. Chroma information is adaptively enhanced, wherein the chroma information adaptive enhancement is performed in a UV chroma space, (u'(x,y),v'(x,y))=w*$\phi$(u(x,y),v(x,y),$\alpha_u$,$\alpha_v$,$\beta_u$,$\beta_v$)

wherein $\phi$(u(x,y),v (x,y),$\alpha_u$,$\alpha_v$,$\beta_u$,$\beta_v$) is a transformation function, w is a weight function, and a UV chroma deviation position is determined by $\alpha_u$ and $\alpha_v$, a chroma adjusting step is determined by $\beta_u$ and $\beta_v$.

Figure 4:
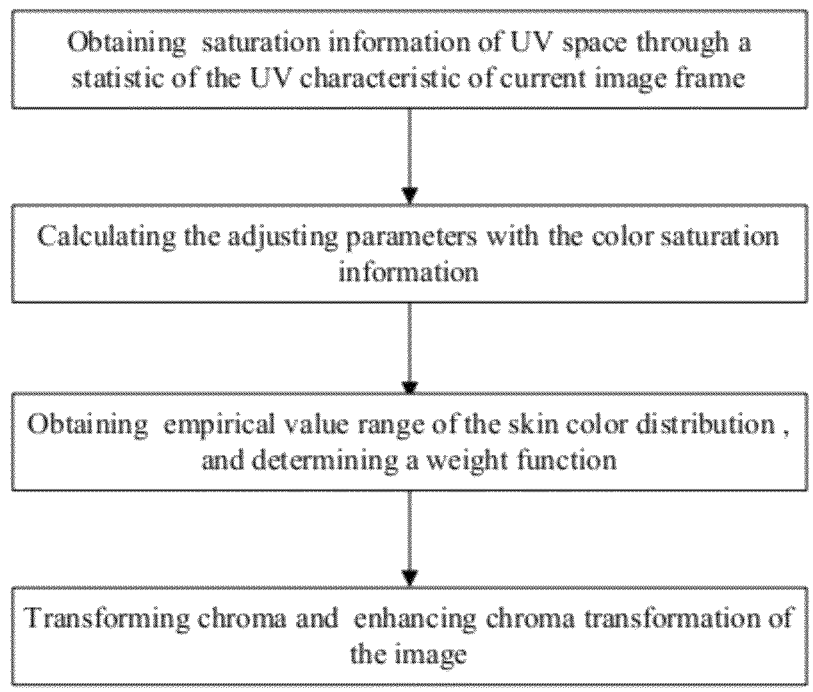
FIG. 4 is a flow diagram of adaptive enhancement of chroma information shown in FIG. 1.

As shown in FIG. 4, following steps are further comprised:

a3: Saturation information of the UV space $\kappa$ is obtained through a statistic of the UV characteristic of the current image frame;

b3: Adjusting parameters are calculated with the color saturation information;

$\alpha_u$=$\gamma_u$($\kappa$)$\beta_u$=$\gamma_u$($\kappa$)

$\alpha_v$=$\gamma_v$($\kappa$)$\beta_v$=$\gamma_v$($\kappa$)

c3: By statistical experiments in the UV space model, empirical value range of skin color distribution is obtained, and the weight function w=$\eta$($\theta$) is determined, wherein $\theta$ is the empirical value range of skin color, $\theta$∈[$\theta_1$,$\theta_2$].

w=$\eta$($\theta$), $\eta$($\theta$) is a continuous function having only one minimum value, and $w_{min}$=$\eta$(($\theta_1$+$\theta_2$)/2).

d3: Chroma transformation is implemented using the chroma transformation function (u'(x,y),v'(x,y))=w*$\phi$(u(x,y),v(x,y),$\alpha_u$,$\alpha_v$,$\beta_u$,$\beta_v$), and the chroma information of the image is enhanced;

wherein $\phi$(u(x,y),v(x,y),$\alpha_u$,$\alpha_v$,$\beta_u$,$\beta_v$) is the transformation function, w is the weight function, the UV chroma deviation position is determined by $\alpha_u$ and $\alpha_v$, and the chroma adjusting step is determined by $\beta_u$ and $\beta_v$.

Although transformation between different models can be realized through color space transformation technologies, computational complexity bought in by the transformation and invert transformation is also considerable. Considering the document format processed by the encoder, format conversation time should be reduced. The present invention implements a color information process directly in the UV chroma space.

Figure 5:
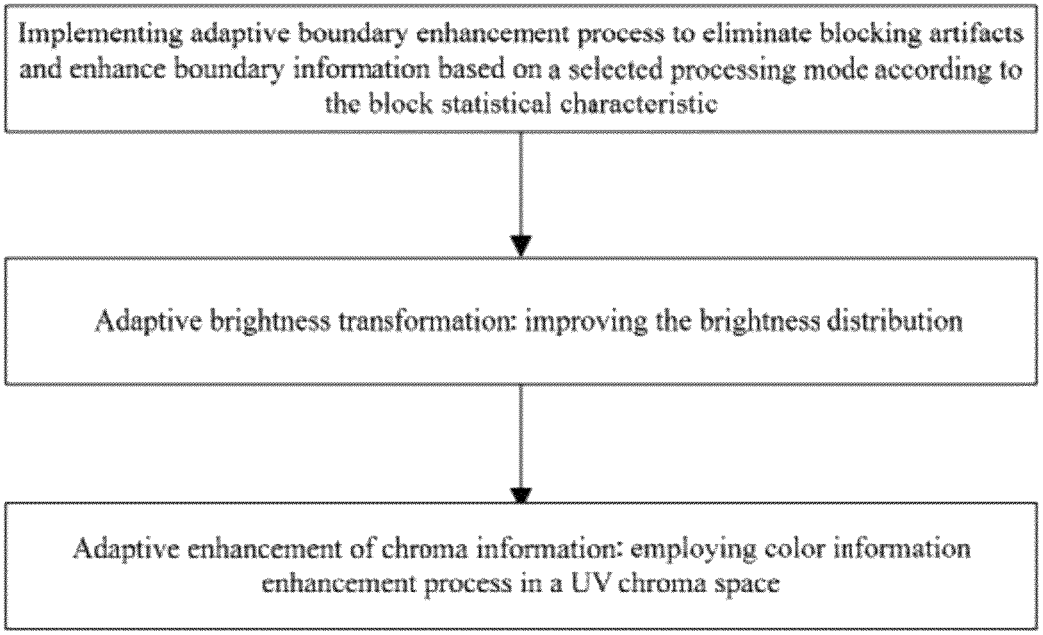
FIG. 5 is a flow diagram of a method at the decoder according to an embodiment of the present invention.

Referring FIG. 5, FIG. 5 is a flow diagram of the method for image visual effect improvement of video encoding and decoding at the decoder according to an embodiment of the present invention. The method comprises the following steps at the decoder:

10. Selecting a processing mode $$t\_0 = \sum_{x,y \in \Re_0} \hbar_0(f(x, y))$$

according to block statistical characteristic if (t__0>Thres__1) mod e=Flat region processing method else mod e=Complex region processing method Then, operations for eliminating blocking artifacts and enhancing boundary information are implemented based on the determined processing mode.

For processing of flat regions:

$t\_1_j$=$\hbar_1$ (f(x,y)|f(x,y)∈$\Re_j$ )

if ($t\_1_j$>$Thres\_2$)weighted lowpass filtering else protecting the boundary information wherein t__1j is a statistical characteristic variable name of the j-th flat region $\Re_j$ , Thres__2 is a threshold for the currently processed flat region processed by the selected different processing methods.

For processing of complex regions:

$t\_2_j$=$\hbar_2$ (f(x,y)|f(x,y)∈$\Re_j$ )

if ($t\_2_j$>$Thres\_3$)

f($x_M$,$y_N$)|($x_m$,$y_n$)∈block$_j$, m=1, 2, . . . , M, n=1, 2, . . . , N)−=$\kappa$;

f($x_1$,$y_1$)|($x_m$,$y_n$)∈block$_{j+1}$, m=1, 2, . . . , M, n=1, 2, . . . , N)+=$\kappa$;

else enhancing the boundary information.

wherein f(x,y) is a original image value at the decoder, t__0 is a statistical variable name of a statistical region $\Re_0$ , $\hbar_j$ (j=0, 1, 2) is a statistical characteristic function, $\Re_j$ is a statistical region corresponding to $\hbar_j$, and Thres__1 is a threshold for determining whether the current processing region is a flat region or a complex region; t__2j is a statistical characteristic variable name of the j-th complex region $\Re_j$, Thres_3 is a threshold for the currently processed complex region processed by the selected different processing methods.

The following table shows comparative experiment between the adaptive boundary information enhancement process of the present step and the separation method process in the prior art. The experiment uses images with a source size of 320×240, and same decoders are used. Comparison of objective effects is as follows:

| Test sequence | processing method | | |
| --- | --- | --- | --- |
| | Separation method | Adaptive boundary information enhancement method Speed (fps) | Increase of processing speed |
| Test1_WMV | 187 | 280 | 49.7% |
| Test3_FLV | 181 | 253 | 39.8% |
| Test4_FLV | 182 | 249 | 36.8% |
| Test2_FLV | 188 | 252 | 34.0% |

It can be seen from the above table that, processing speed can be significantly improved by the adaptive boundary information enhancement method in accordance with the present invention.

Figure 6:
FIG. 6 is a contrast diagram showing an original decoded image at the decoder and two images processed by the conventional separation method and the adaptive boundary enhancement respectively using test source in WMV format.
Figure 6:
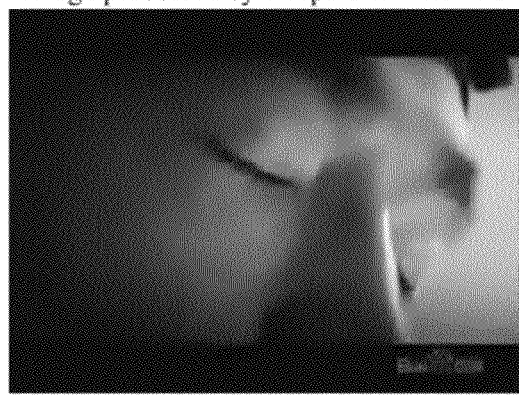
Figure 6:
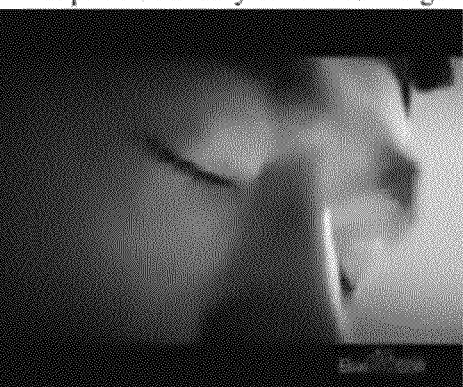

FIG. 6 is a contrast diagram showing an original decoded image at the decoder and two images processed by the conventional separation method and the adaptive boundary enhancement respectively using test source in WMV format. Through comparison of the objective effect, the objective quality of the image is significantly improved by the image processing method of adaptive boundary enhancement according to the present invention.

20. Brightness of the image is adaptively transformed, and the brightness distribution of the image is improved. The principle of adaptive brightness transformation is that, the set of parameters of the transformation function is adaptively updated according to a statistical characteristic of brightness value of the image before being transformed, so that the transformation function is adjusted dynamically along with different image characteristics, and thus the processing method is optimized:

$$g(x,y)=\psi(f(x,y),\alpha(k)|k=1, 2, \ldots, K),$$

wherein $f(x,y)$ is a brightness value of the original image at the decoder, $g(x,y)$ is a transformed brightness value, $\psi(x,\alpha(k)|k=1, 2, \ldots, K)$ is the transformation function, wherein $\alpha(k)$ is the set of parameters of the transformation function $\psi(x,\alpha(k)|k=1, 2, \ldots, K)$, and K is the number of the parameters.

30. Chroma information is adaptively enhanced, wherein the chroma information adaptive enhancement is performed in a UV chroma space, $$(u'(x,y),v'(x,y))=w*\phi(u(x,y),v(x,y),\alpha_u,\alpha_v,\beta_u,\beta_v)$$

wherein $\phi(u(x,y),v(x,y),\alpha_u,\alpha_v,\beta_u,\beta_v)$ is a transformation function, w is a weight function, and a UV chroma deviation position is determined by $\alpha_u$ and $\alpha_v$, a chroma adjusting step is determined by $\beta_u$ and $\beta_v$.

Figure 7:
FIG. 7 is a contrast diagram showing effects of an original decoded image and a processed image by the present invention using test source in WMV format.
Figure 7:

FIG. 7 is a contrast diagram showing effects of an original decoded image and a processed image by the present invention using test source in WMV format. After implementing the step 10, step 20 and step 30 of the above-mentioned method, blocking artifacts are eliminated, luminance and chrominance information of the image are enhanced by adaptive adjustment, so that the object of improving objective effect and subjective effect of the decoded image is achieved.

The foregoing description of the exemplary embodiments of the invention has been presented only for the purposes of illustration and description and is not intended to be exhaustive or to limit the invention to the precise forms disclosed. Many modifications and variations are possible in light of the above teaching without departing from the protection scope of the present invention.

The invention claimed is:

1. A method for image visual effect improvement of video encoding and decoding, comprising the following steps at an encoder:

extracting image boundary information and enhancing a boundary information, the step further comprising:
extracting boundary information h(x,y) of an image f(x, y), $$h(x,y)=\gamma(f(x,y));\text{and}$$

obtaining a boundary enhanced image g(x,y) by transforming the extracted boundary information h(x,y) and the image f(x,y), $$g(x,y)=\phi(f(x,y), h(x,y)),$$

wherein $f(x,y)$ is a brightness value of the original image at the encoder, $\gamma(f(x,y))$ is a boundary information extracting function, $\phi(f(x,y),h(x,y))$ is a transformation function selected according to characteristics of the original image and the boundary information;

adaptive luminance transforming to improve luminance distribution:

$$g'(x,y)=\psi(f(x,y),\alpha(k)|k=1, 2, \ldots, K),$$

wherein $g'(x,y)$ is a transformed brightness value, $\psi(x,\alpha(k)|k=1, 2, \ldots, K)$ is a transformation function, wherein $\alpha(k)$ is a set of parameters of the transformation function $\psi(x,\alpha(k)|k=1, 2, \ldots, K)$, and K is the number of the parameters;

adaptively enhancing the chrominance information, which is performed in the UV color space, $$(u'(x,y),v'(x,y))=w*\phi(u(x,y),v(x,y),\alpha_u,\alpha_v,\beta_u,\beta_v)$$

wherein $\phi'(u(x,y),v(x,y),\alpha_u,\alpha_v,\beta_u,\beta_v)$ is a transformation function, w is a weight function, and a UV chroma deviation position is determined by $\alpha_u$ and $\alpha_v$, a chroma adjusting step is determined by $\beta_u$ and $\beta_v$, u(x,y),v (x,y) are UV coordinate value before adaptively transformation, and (u '(x,y),v '(x,y) are UV coordinate value after adaptively transformation;

wherein the step of adaptive luminance transforming to improve luminance distribution further comprising following steps:

given a characteristic space of the current frame image being $$\xi = \bigcup_{k=1}^{M} \xi_k,$$

$\xi_i \cap \xi_j = \phi, i \neq j$, and obtaining a whole statistical characteristic of the image by a statistic of the brightness information, for (k=0; k<M; k++) if $(f(x,y)\in\xi_k)$ calculating a statistical characteristic $\phi_k(f(x,y))$ of $\xi_k$;and obtaining the statistical characteristic of the current frame image:

$$\{\phi_k(f(x,y))|k=1, 2, \ldots, M\};$$

wherein $\xi_k$ and $\phi_k(f(x,y))$ are image characteristic subspace, the statistical characteristic of $\xi_k$ respectively;

adjusting the threshold according to visual characteristic together with the regional statistical characteristic, and dividing the image into different regions $$\Omega = \bigcup_{k=1}^{N} \Omega_k,$$

and adjusting the statistical characteristic threshold $P_H$ to be $P'_H$ according to a statistical relationship between the global area and the regions, $$P'_H = \text{ratio}*\eta(P_H, \Phi_1, \Phi_2, \ldots, \Phi_N)$$

wherein $\Phi_k$ is a statistical characteristic of $\Omega_k$, $$\Phi_k = \{\phi_1(\Omega_k), \phi_2(\Omega_k), \ldots, \phi_M(\Omega_k)\}$$

$P_H, P'_H$ are the threshold obtained through the whole statistical information and the adjusted threshold respectively;

obtaining parameter values of the transformation function based on the statistical characteristic;

$$\alpha(k) = \hbar_k(P'_H) k=1, 2, \ldots K$$

$\hbar_k(x)$ is a adjusting function of the parameter $\alpha(k)$ of the transformation function $\psi(x,\alpha(k)|k=1, 2, \ldots, K)$; and using brightness transformation function $\psi(f(x,y),\alpha(k)|k=1, 2, \ldots, K)$, to implement brightness transformation and improve distribution of the image brightness information.

2. The method according to claim 1, wherein the step of adaptively enhancing the chromiance information further comprises.

obtaining saturation information of the UV space $\kappa$ through a statistic of the UV characteristic of the current image frame by constructing a UV chroma space model $$\text{mod}(u(x,y),v(x,y)) = \sqrt{u(x,y)^2 + v(x,y)^2},$$

$$\theta = \arctan\left(\frac{v(x,y)}{u(x,y)}\right);$$

calculating the adjusting parameters with the color saturation information;

$$\alpha_u = \gamma_u(\kappa)\beta_u = \gamma_u(\kappa)$$

$$\alpha_v = \gamma_v(\kappa)\beta_v = \gamma_v(\kappa)$$

obtaining an empirical value range $\theta \in [\theta_1, \theta_2]$ of skin color distribution by statistical experiments in the UV space model, and determining a weight function $w=\eta(\theta)$, wherein $\eta(\theta)$ is a continuous function having only one minimum value and $w_{min} = \eta((\theta_1+\theta_2)/2)$, w is used to control a flat transition to other color zones; and implementing chroma transformation by using the chroma transformation function $(u'(x,y),v'(x,y)) = w*\phi(u(x,y),v(x,y),\alpha_u,\alpha_v,\beta_u,\beta_v)$ to enhance chroma information of the image.

3. The method according to claim 1, wherein $\gamma(f(x,y))$ is a boundary information extracting function, and a gradient module extracting method is employed:

$$|grad(f(x,y))| = \max_l\left(\frac{\partial f(x,y)}{\partial l}\right).$$

4. A method-for image visual effect improvement of video encoding and decoding, comprising the following steps at a decoder:

selecting a processing mode $$t\_0 = \sum_{x,y \in \Re_0} \hbar_0(f(x,y))$$

according to block statistical characteristic, if ($\tau\_0$>Thres__1) mod e= Flat region processing method else mod e= Complex region processing method then implementing operations for eliminating blocking artifacts and enhancing boundary information based on the determined processing mode;

wherein $f(x,y)$ is a original image value at the decoder, t__0 is a statistical variable name of a statistical region $\Re_0$, $\hbar_j$ (j=0, 1, 2) is a statistical characteristic function, $\Re_j$ is a statistical region corresponding to $\hbar_j$, and Thres__1 is a threshold for determining whether the current processing region is a flat region or a complex region;

adaptively transforming the brightness and improving brightness distribution of the image;

adaptively enhancing the chroma information, wherein the chroma information adaptive enhancement is performed in a UV chroma space;

wherein, said operations for eliminating blocking artifacts and enhancing boundary information comprise:

for processing of flat regions:

$$t\_1_j = \hbar_1(f(x,y)|f(x,y) \in \Re_j)$$

if(t__1$_j$>Thres__2) weighted lowpass filtering, else protecting the boundary information, wherein t__1j is a statistical characteristic variable name of the j-th flat region $\Re_j$, Thres__2 is a threshold for the currently processed flat region processed by the selected different processing methods;

for processing of complex regions:

$$t\_2_j = \hbar_2(f(x,y)|f(x,y) \in \Re_j)$$

if($t\_2_j$>Thres__3)

$f(x_M,y_N)|(x_m,y_n) \in \text{block}_j, m=1, 2, \ldots, M, n=1, 2, \ldots, N)-=\kappa;$ $f(x_1,y_1)|(x_m,y_n) \in \text{block}_{j+1}, m=1, 2, \ldots, M, n=1, 2, \ldots, N)+=\kappa;$ else enhancing the boundary information, wherein t__2j is a statistical characteristic variable name of the j-th complex region $\Re_j$, Thres__3 is a threshold for the currently processed complex region processed by the selected different processing methods.

* * * * *